United States Patent
Guelluek et al.

(10) Patent No.: US 8,322,501 B2
(45) Date of Patent: Dec. 4, 2012

(54) FORCE TRANSMISSION DEVICE

(75) Inventors: Toros Guelluek, Lichtenau (DE); Bruno Mueller, Sasbach (DE); Stephan Maienschein, Baden-Baden (DE); Thorsten Krause, Buehl (DE); Mario Degler, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 667 days.

(21) Appl. No.: 12/491,822

(22) Filed: Jun. 25, 2009

(65) Prior Publication Data
US 2009/0321206 A1    Dec. 31, 2009

(30) Foreign Application Priority Data
Jun. 26, 2008   (DE) .......................... 10 2008 030 472

(51) Int. Cl.
F16H 45/02   (2006.01)
(52) U.S. Cl. ...................................... 192/3.3; 192/70.12
(58) Field of Classification Search .................. None
See application file for complete search history.

(56) References Cited

U.S. PATENT DOCUMENTS

| | | | |
|---|---|---|---|
| 2007/0205067 A1* | 9/2007 | Frey et al. | 192/3.3 |
| 2007/0235277 A1* | 10/2007 | Heuler et al. | 192/3.3 |
| 2008/0308378 A1* | 12/2008 | Abe et al. | 192/70.12 |

FOREIGN PATENT DOCUMENTS

| | | |
|---|---|---|
| DE | 19722151 | 12/1997 |
| DE | 10350935 | 5/2004 |
| WO | 2007048505 | 5/2007 |
| WO | 2007079713 | 7/2007 |

* cited by examiner

Primary Examiner — Rodney Bonck
(74) Attorney, Agent, or Firm — Simpson & Simpson, PLLC

(57) ABSTRACT

A force transmission device having a hydrodynamic component, disposed between an input and an output, comprising at least a pump shell and a turbine shell, forming an operating cavity in combination, with an actuatable clutch device for at least partially bridging the hydrodynamic component, comprising a clutch component for at least partially bridging the hydrodynamic component, comprising a first clutch component connected with the input and a second clutch component at least indirectly connected to the output, which can be brought into operative engagement with one another through an actuation device, with a vibration absorber disposed in the force flow at least subsequent to the actuatable clutch device, with a housing coupled with the input or with an element coupled non-rotatably to the input and coupled with the pump shell.

8 Claims, 2 Drawing Sheets

FORCE TRANSMISSION DEVICE

CROSS-REFERENCE TO RELATED APPLICATIONS

This patent claims priority of German Patent Application No. 10 2008 030 472.7, filed on Jun. 26, 2008, which application is incorporated herein by reference.

FIELD OF THE INVENTION

The invention relates to a force transmission device with an input and an output, a hydrodynamic component, disposed between input and output, comprising at least a pump shell and a turbine shell, forming an operating cavity in combination, with an actuatable clutch device for at least partially bridging the hydrodynamic component, comprising a clutch component for at least partially bridging the hydrodynamic component, comprising a first clutch component connected with the input and a second clutch component at least indirectly connected to the output, which can be brought into operative engagement with one another through an actuation device, with a vibration absorber disposed in the force flow at least subsequent to the actuatable clutch device, with a housing coupled with the input or with an element coupled non-rotatably to the input and coupled with the pump shell, which housing encloses the actuatable clutch device and the vibration damper and forms an intermediary space there between, and with means for separating a channel and/or a chamber from the intermediary cavity for generating an oriented flow through the actuatable clutch device.

BACKGROUND OF THE INVENTION

Force transmission devices for applications in motor vehicles are known in various configurations. They comprise a hydrodynamic component and an actuatable clutch device for circumventing the power transmission through the hydrodynamic component. The flow routing within the force transmission device is performed, so that the hydrodynamic component flows through in a centrifugal or centripetal direction. Thus, in one operating mode of the hydrodynamic component, the flow medium is not only turned over in the operating cavity, but it is also run through an external cooling loop outside of the hydrodynamic component. Furthermore, the operating medium also remains in the force transmission device in a bridged condition of the force transmission device and it is run through an external loop for cooling purposes. The routing is typically performed through the intermediary space defined by the housing of the force transmission device and the outer circumference of the hydrodynamic component, wherein, in particular, in embodiments in a two-channel configuration, in which the force transmission device is characterized by at least two connections and the operation of the actuation device of the actuatable clutch is performed by controlling the pressure difference between the two connections, the flow medium is run through the actuatable clutch device for cooling purposes. On the other hand, embodiments in three-channel configurations are characterized in that a separate chamber loadable with pressure medium is associated with the actuation device, which chamber provides free adjustability of the actuation pressure through a third connection. The actuatable clutch device is typically configured as a friction locking clutch, wherein the configuration is performed in disk construction and thus as a multidisk clutch. The slipping operation, however, leads to strong heating and loading of the friction liners. Insufficient cooling and abrasion and breakdown components of the friction liners and waste products in the flow medium furthermore degrade the function and reliability of the actuatable clutch device.

From the printed document DE 103 50 935 A1, an embodiment of a force transmission device is known, in which measures are taken in order to restrict the oil flow in the force transmission device in certain portions, so that a general pressure increase in the housing is created. In the first solution described in the embodiment, at least one additional resistance element for the oil flow is disposed between the inside of the converter housing and the outer circumference of the turbine shell, which causes the oil flow not to be able to flow through the cavity without restriction. The additional element is formed by the actuatable clutch device itself. Furthermore, alternatively or additionally, a reinforcement of the oil flow is possible through configuring channels in at least one of the disks.

In an embodiment as a three-channel converter, as described in WO 2007/079713 A1, a pressure tight additional wall is provided, which is disposed on the side of the piston element and which faces the first cavity which forms a gap between the piston element and the additional wall. The additional wall is placed substantially oil tight against the disks facing the piston and simultaneously facilitates a hydraulic separation from the adjacent pressure cavities, in particular the intermediary space and the separate cavity which can be loaded with operating means.

The printed document WO 2007/048505 A1 discloses an embodiment, in which the disks of the actuatable clutch device, which can be operated by a piston element, route hydraulic fluid along the clutch disks to a torsion damper. The hydraulic fluid which is routed through the pressure cavity for the actuatable clutch device is subsequently routed along the clutch disks into the interior cavity of the converter, which provides highly efficient cooling.

An embodiment of a force transmission device of this type is known from the printed document DE 197 22 151 A1. The force transmission device comprises an input and an output, a hydrodynamic component disposed between input and output, comprising at least a pump shell and a turbine shell forming an operating cavity in combination, and an actuatable clutch device for at least partially bridging the hydrodynamic component, comprising a first clutch component connected to the input and a second clutch component at least indirectly connected with the output. A vibration damper is disposed in a force flow direction behind the actuatable clutch device and the hydrodynamic component. The force transmission device furthermore comprises a housing coupled to the input or to an element connected torque proof to the input, and coupled to the pump shell, which housing encloses the actuatable clutch device and the vibration damper and forms an intermediary space. Means for forming a flow cycle between the operating cavity and the intermediary space are provided, wherein means for generating an oriented flow through the actuatable clutch device are disposed in the intermediary space, which means conduct the flow medium directly into the portion of the actuatable clutch device through forming a channel, which channel is implemented through the connection of the second clutch component with the vibration damper. The operating medium flowing through the force transmission device exits at the outer circumference of the actuatable clutch device after going through a deflection. The disadvantage of this embodiment is that not the entire operating means is conducted through the actuatable clutch device, but some is run through the damper.

SUMMARY OF THE INVENTION

Thus, it is an object of the invention to provide and configure a force transmission device as stated supra, in particular an embodiment in three-channel configuration, so that the disadvantages are avoided and an effective cooling of the actuatable clutch device is obtained, in order to increase the service life of the friction liners, and thus the availability of the actuatable clutch device. The controllability of the actuatable clutch device has to be improved by avoiding excessive temperature related variations of the friction coefficient of the clutch.

A force transmission device with an input and an output, a hydrodynamic component disposed between input and output, comprising at least a pump shell and a turbine shell forming an operating cavity in combination, with an actuatable clutch device for at least partial bridging of the hydrodynamic component, comprising a first clutch component connected with the input, and a second clutch component at least indirectly connected to the output, which can be brought into operative engagement with one another through an actuation device, with a vibration damper disposed in the force flow at least behind the actuatable clutch device, with a housing coupled to the input or to an element connected torque proof to the input and coupled to the pump shell, which housing encloses the actuatable clutch device and the vibration damper and forms an intermediary space, and with means for separating a channel and/or a chamber from the intermediary space for generating an oriented flow through the actuatable clutch device, wherein the chamber is formed by the actuation device and by a wall disposed pressure tight between the second clutch component and the output or an element connected torque proof with the output.

The solution according to the invention facilitates routing a defined volume flow to the actuatable clutch device from the external cooling cycle of the hydrodynamic component, which volume flow facilitates a sufficiently secured cooling of an actuatable clutch device under all operating conditions, which can be operated with pressure means, in particular oil. This facilitates improvements of the cooling of the actuatable clutch device for reducing the maximum temperatures generated by the friction induced power loss at the friction surfaces, and damages to the operating medium and the friction liners of the actuatable clutch device through excessive temperatures are prevented.

The solution according to the invention facilitates to actively route the flow medium to the clutch packet, which flow medium is turned over in the hydrodynamic component and routed through an external coolant cycle, by reducing the many theoretically possible paths of the flow medium through the force transmission device to the hydrodynamic component to a single path.

The means for generating an oriented flow to the actuatable clutch device through only a partial portion of the intermediary space are characterized in that they provide at least a channel or a flow cavity which is separated from the remaining intermediary space. The separation can be provided through different configurations. According to a first embodiment, the components which are provided anyhow are configured and disposed, so that they facilitate the function of forming the additional channel or pressure chamber, or separate elements are installed according to a second embodiment, which can also be retrofitted into existing systems in a simple manner. The additional wall is at least partially formed by the second clutch component.

According to an advantageous variant of the first embodiment, it is conceivable to configure the second clutch component of the actuatable clutch device, so that it separates a space or channel from the intermediary space through the piston element, which intermediary space is formed by the outer circumference of the hydrodynamic component and by the inner circumference of the housing. For this purpose, the second clutch component, in particular the disk carrier of the second clutch component, is configured in radial direction, so that it is extended as far as possible in inward direction in the direction towards the rotation axis and guided pressure tight at the respective connection element, in particular at the output or at an element connected torque proof therewith.

In another variant of the first embodiment, the described additional wall is formed by a connection element at the second clutch component, in particular by the input of a vibration damper. In this case, the damper input is preferably configured as drive disk, which extends in radial direction into the portion of the connection hub. Also here, a seal device is provided between the drive disk and the connection hub.

In both cases, the additional wall is shaped according to the desired flow routing. A sealing of the respective element, in particular of the second clutch component or of the damper input relative to the connection element, in particular the output of the force transmission device or the transmission input shaft, or an element coupled non-rotatably therewith, can be performed in a simple manner through sealing devices, in particular seal rings.

The embodiments according to the second solution facilitate a simple retrofit of the additional cooling measure into existing systems. For this purpose, only an additional disk shaped element, in particular a seal plate, has to be provided, which is also guided pressure tight, with respect to the output or with respect to an element connected non-rotatably to the output, and the seal plate is connected non-rotatably with the second clutch component and forms the channel or chamber together with the second clutch component and the actuation device. In a particularly advantageous manner, the connection between the seal plate and the second clutch component is performed on the same diameter as the connection between the second clutch component and the vibration damper, while using the same connection elements.

BRIEF DESCRIPTION OF THE DRAWINGS

The solution according to the invention is subsequently described with reference to figures, wherein.

DETAILED DESCRIPTION OF THE INVENTION

Figure 1:
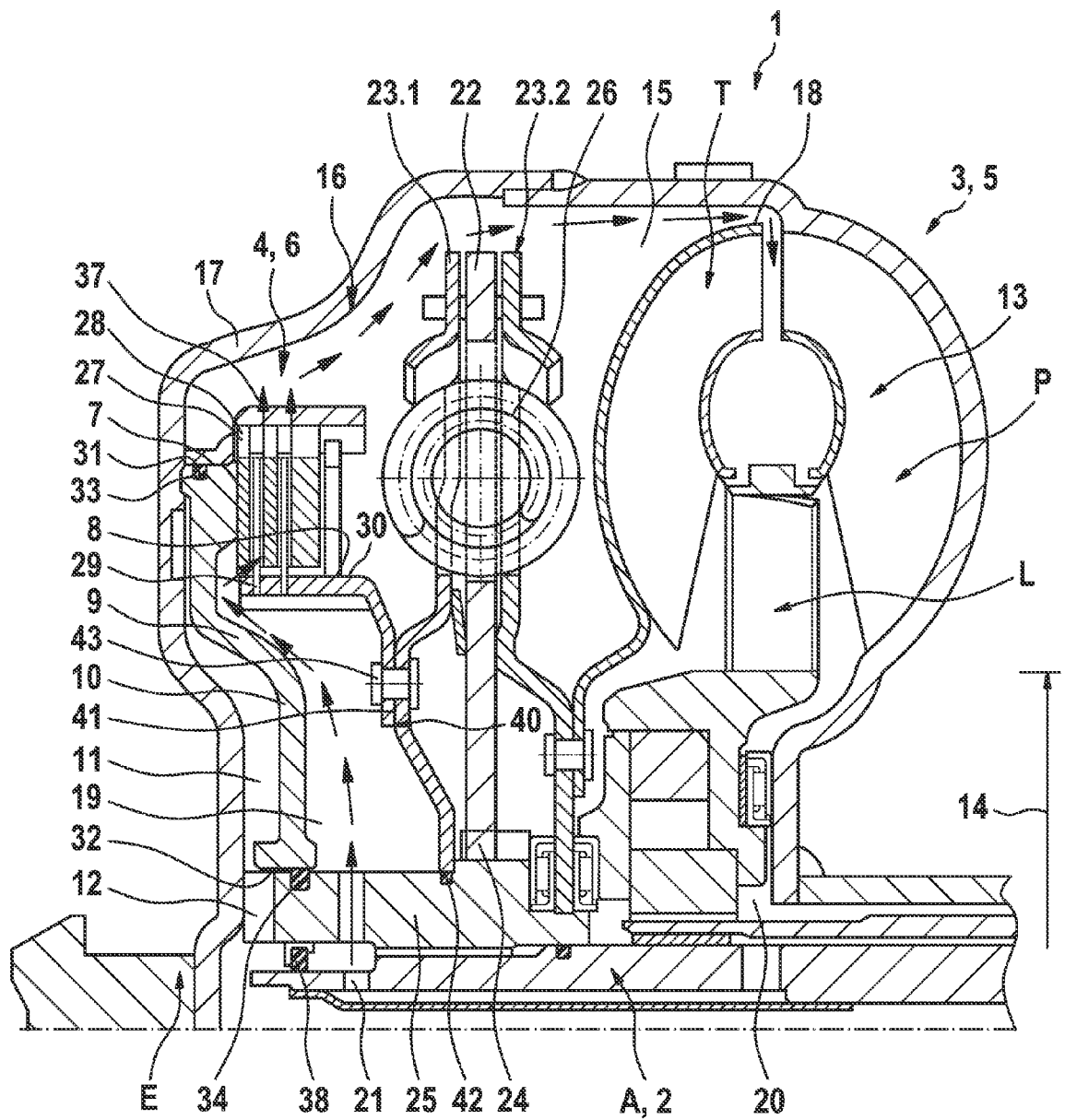
FIG. 1 illustrates a first variant according to the first embodiment of the solution according to the invention with reference to a detail of an axial sectional view of a transmission device.

FIG. 1 illustrates the basic principle and the basic function of a force transmission device 1 according to a first embodiment of the invention in a highly simplified depiction, which force transmission device comprises at least an input E and an output A, wherein the input E can be connected at least indirectly non-rotatably with a drive engine, which is not shown here. Thus, the output A is connected in an exemplary manner with another unit, which receives and transmits power, in particular a transmission, disposed in the force flow in the drive train, wherein the output A is either formed by the transmission input shaft 2, or by an element connected non-rotatably therewith. The input E and the output A are thus disposed preferably coaxial to one another. Between the input E and the output A, a hydrodynamic component 3 and an actuatable clutch device 4 are disposed forming a first hydrodynamic power path 5 and a second mechanical power path 6. The actuatable clutch device 4 and the hydrodynamic component 3 are thus preferably disposed in parallel to one another and can at least be actuated in parallel. This means, that the force flow can be routed either solely through one of the two components, hydrodynamic component 3, or actuatable clutch device 4, or it can be routed through both in combination in a power split. The hydrodynamic component 3 comprises at least a pump shell P, which is at least indirectly connected non-rotatable to the input E and it comprises a turbine shell T, which is at least indirectly connected with the output A of the force transmission device 1. In the illustrated case, the hydrodynamic component 3 is preferably configured as a hydrodynamic speed/torque converter. It comprises at least another stator shell L, which is used as a reaction member for speed/torque conversion. The hydrodynamic speed/torque converter thus functions as a hydrodynamic transmission in which a speed conversion always causes a torque conversion. However, also an embodiment solely as hydrodynamic clutch is conceivable. In this case, the hydrodynamic component 3 does not comprise a stator shell and functions solely as a speed converter. The actuatable clutch device 4 is preferably configured as a friction locking clutch device. The configuration is preferably performed as a friction locked clutch in disk construction. For this purpose, the actuatable clutch device respectively comprises a first clutch component 7, which is connected at least indirectly non-rotatably to the input E, and a second clutch component 8, which is connected at least indirectly non-rotatably to the output A of the force transmission device 1, wherein the first clutch component 7 and the second clutch component 8 can be brought at least indirectly into operative engagement with one another through an actuation device 9, this means directly or through additional transmission elements. When the actuatable clutch device 4 is configured in disk construction, the respective first clutch component 7 and the second clutch component 8 comprise at least a disk shaped element, comprising portions bearing friction surfaces, which can be brought into operative engagement with one another through a piston element 10 of the actuation device 9, which piston element can be actuated by a chamber 11, which can be loaded with pressure medium. The chamber 11, which can be loaded with pressure means, is thus configured by the pressure and liquid tight guide of the piston element 10 between the input E and the output A, or by a respective element connected non-rotatably therewith. Thus, preferably a non-rotatable coupling of the piston element 10 is either performed with the input E or with the output A. At least a connection 12 is associated with the chamber 11, which can be loaded with pressure means, through which connection the pressure in the chamber 11, which can be loaded with pressure means, is freely adjustable, this means variable adjustable.

The actuatable clutch device 4 is configured as a disk clutch herein, comprising a support 27 connected non-rotatably with the input E in the first clutch component 7, which support 27 is provided as an outer disk support, and friction surface bearing or friction surface forming elements 28 in the form of disks, which are movably guided in an axial direction at the outer disk support and which are coupled non-rotatably therewith, which disks can be brought into operative engagement with the friction surface bearing or friction surface forming elements 29 of the second clutch component 8. The friction surface bearing or friction surface forming elements 29 of the second clutch component 8 are also configured as disks and supported at a support 30, which is configured as an inner disk support and connected to the output A at least indirectly non-rotatably, herein through a vibration damper 22. The particular disk shaped elements 28 and 29 thus form friction surfaces in the portions which can be connected with one another through friction locking, which friction surfaces can be brought into operative engagement with one another through configuring friction pairings. The guiding of the piston element 10 of the actuation device 9 of the actuatable clutch device 4 is then performed at the support 27, connected non-rotatably with the input E in the portion of the outer circumference 31 of the piston element. The guiding relative to the output E is performed here in the element coupled non-rotatably with the output, which element is provided as an output hub 25. For pressure and liquid tight guiding, seal devices 33 and 34 are respectively provided at the outer circumference 31 of the piston element 10 and also at the inner circumference 32. The seal devices are configured as movable seal devices.

The hydrodynamic component 3 can flow in a centrifugal or centripetal manner. The flow-through direction thus depends on the pressure difference between the pressure in the operating cavity 13 and the intermediary cavity 15 of the force transmission device 1, formed by the outer circumference 18 of the hydrodynamic component 3 and the inner circumference 16 of the housing 17. In the operating mode of the force transmission device 1 with force flow through the hydrodynamic component 3, operating means in the portion of the outer circumference 18 of the hydrodynamic component 3 is inducted through the separation gap disposed between the pump shell P and the turbine shell T into the operating cavity 13 and a flow cycle is generated between the bladed shells due to the rotation of the pump shell P, which flow cycle is also designated as an operating flow cycle. Furthermore, the operating means is removed from the operating cycle disposed in the operating cavity 13 in the portion of the inner diameter 14 of the operating cavity 13, and run out of the hydrodynamic component 3 for cooling purposes, and supplied back to the operating cavity 13 through the gap 15 disposed in the force transmission device 1. The flow-through direction can also be reversed in the hydrodynamic operating mode. In a purely mechanical power transmission, through the actuatable clutch device 4, the hydrodynamic component 3 is bridged and the flow-through direction is typically reversed relative to the purely hydrodynamic operation.

The flow-through direction of the force transmission device 1 in the particular operating modes can thus vary depending on the control of the particular chambers; in particular, it can vary between centrifugal and centripetal at the hydrodynamic component 3. Thus, also a routing of at least a portion of the flow medium is performed through a loop, which can be configured closed or open depending on the embodiment and which is configured between the operating cavity 13 and the intermediary space 15. According to the invention it is now provided, that the routing of the flow medium is performed in the intermediary space 15 in a concentrated manner through the actuatable clutch device 4. For this purpose, means 40 are provided for separating a channel and/or a chamber 19 from the intermediary space 15 for generating an oriented flow through the actuatable clutch device 4, through which means, a chamber 19 is separated from the intermediary space 15 in the portion of the actuatable clutch device 4, in particular between the second clutch component 8 and the output A, through which chamber the flow medium is supplied to the actuatable clutch device 4 in a controlled manner. The routing is then performed through the elements of the actuatable clutch device 4, which can be brought into operative engagement and from the elements into the remaining cavity 15 back to the hydrodynamic component 3. This facilitates that in the case illustrated in FIG. 1 with centripetal flow-through, the cooling medium turned over through the hydrodynamic component 3 is actively routed in the form of the flow medium to the actuatable clutch device 4 by configuring the possible flow paths in a highly restricted manner, so that they concentrate directly towards the clutch 4. There are a multitude of options with respect to the actual configuration design of the additional chamber 19, separated from the intermediary cavity 15, which possibilities substantially depend on the configuration of the actuatable clutch device 4, in particular the second clutch component 8, and on the coupling to the respective connection element at the second clutch component 8. They all have in common that the chamber 19 is formed by the actuation device 9 and a wall 41 disposed pressure tight between the second clutch component 8 and the output A, or an element connected non-rotatably therewith. The wall 41 can thus be generated in various ways. According to the first embodiment illustrated in FIG. 1, the wall is at least partially formed by the second clutch component 8 and by a connection element to the second clutch component 8. The connection element is formed by the actuatable clutch device 4 and also by the vibration damper 22 disposed in the force flow behind the hydrodynamic component 3. The device 22 is thus disposed in an axial direction in an installed position between the input E and the output A between the actuatable clutch device 4 and the hydrodynamic component 3. The disposition is performed in the intermediary space 15, which is defined by the inner circumference 16 of the housing 17 of the force transmission device 1 and the outer circumference 18 of the hydrodynamic component 3. Thus, the second clutch component 8 is coupled with the damper input 23 of the vibration damper 22. Thus, according to the invention the chamber 19 and thus the flow path is defined by the coupling between the second clutch component 8 and the damper input 23. The vibration damper 22 furthermore comprises a damper output 24, which is at least indirectly connected; this means directly or through additional transmission elements, here, e.g., a so-called output hub, which is also designated as damper hub, wherein the damper input 23 and the damper output 24 are disposed coaxial to one another, but rotatable within limits in circumferential direction. Thus, the coupling between the damper input 23 and the damper output 24 is performed through means 26 for torque transmission and damper coupling. Thus, the functions of torque transmission and damper coupling can be performed by the same elements or also by different elements. The vibration damper 22 can furthermore be configured with only one or plural damper stages, describing damper assemblies which are designated as series dampers or parallel dampers.

The connection element with the actuatable clutch device 4 for forming the wall 41 is formed by the damper input 23 herein. The damper input comprises two drive disks 23.1, 23.2 disposed in axial direction on both sides of the damper output 24, wherein the drive disk 23 facing the actuatable clutch device 4 extends in a radial direction viewed in the direction towards the rotation axis R to the outer circumference of the output hub 25, which is formed by the damper hub. Between the output hub 25 and the drive disk 23.1, a seal device 42 is provided. The torque proof connection 43 between the damper input 23 and the second clutch component 8 is preferably performed through form locked permanent connections. In order to provide complete sealing, furthermore an additional seal device, which is not illustrated herein, can be provided between the second clutch component 8, in particular the flange portion extending in radial direction towards the rotation axis R and the damper input 23.

The seal device is then provided in the portion of the connection 43, preferably, however, on a larger diameter in radial direction, and extends in circumferential direction.

The non-rotatable connection 43 of the support 30 in the form of the inner disk support with the damper input 23 can thus be performed in the typical manner on a relatively large diameter. Furthermore, no modifications are required at the support 30. The second connection 21 is thus disposed in an axial direction between the piston element 10 and the damper input 23 and extends through the output hub 25. In order to let the cooling medium exit from the actuatable clutch device 4 on a direct path, furthermore, openings 37 are particularly advantageously provided in the support 27 provided as an outer disk support, which openings facilitate a transition from the actuatable clutch device 4 into the intermediary space 15. The flow-through of the actuatable clutch device 4 can thus be performed directly in a radial direction on the shortest path without deflections between the particular elements 28, 29 bearing friction surfaces, which can be brought into operative engagement with one another.

Through the identical flow-through direction, on the one hand, there is a lower flow resistance, since herein, no 180° deflection of the flow has to be performed at the outer diameter of the friction surface bearing elements 28, 29, and furthermore, the radial pumping effect can be used in addition to the slippage flow effect in order to increase the self-feeding effect within the grooves. In order for the flow medium to be able to spread well between the friction surface bearing elements, they are either provided with pass-through openings in the portion of their inner diameter, or the non-rotatable connection has so much tolerance that no sealing contact is performed at the support 30 in the portion of the inner circumference.

The force transmission device 1 is provided at least as three-channel unit, this means it forms three different cavities, which can be respectively coupled to a connection. In the illustrated case, the three different cavities are the operating cavity 13, to which a first connection 20 is associated, the intermediary cavity 15, and the chamber 11 which can be loaded with pressure means to which the connection 12 is associated, in order to variably load the chamber 11, which can be loaded with pressure means. The coupling between the first connection 20 and the second connection 21 is provided pressure-and liquid tight with respect to the connection 12. For this purpose, another seal device 38 is provided, which is disposed between the output hub 25 and the transmission input shaft 2, in particular between the inner circumference or a partial portion of the output hub 25, forming an inner circumference, and an outer circumference or a partial portion of the transmission input shaft 2, forming an outer circumference.

Figure 2:
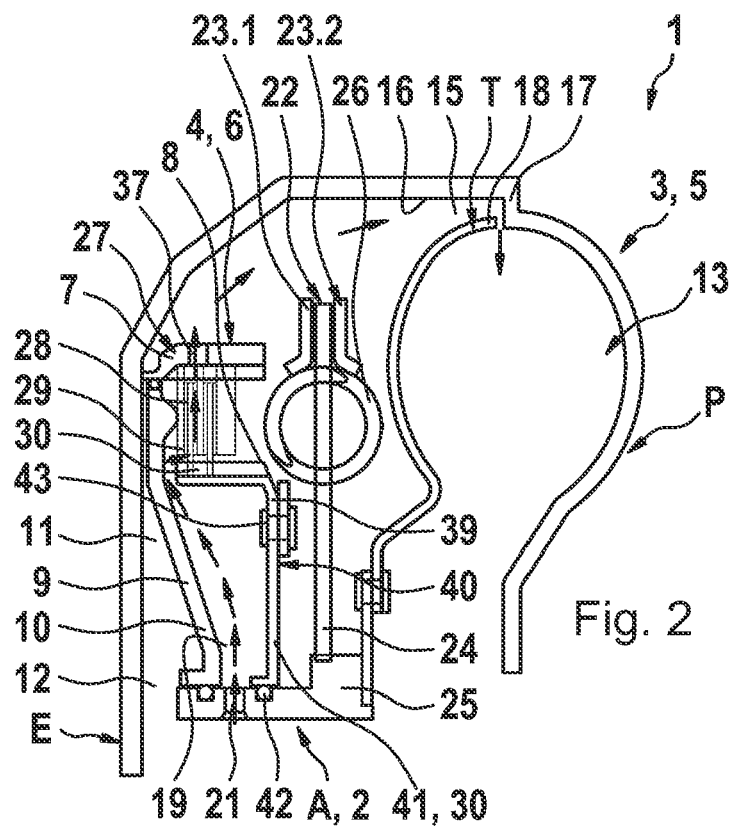
FIG. 2 illustrates a second variant according to the first solution in a simplified schematic depiction; and, FIG. 3 illustrates an embodiment according to the second solution in a simplified schematic depiction.

FIG. 2 illustrates an improvement according to an embodiment of FIG. 1, in which the configuration of the flow path is performed through the chamber 19 at the radially inward support 30 of the second clutch component 8. For this purpose, the inner disk carrier is configured and formed in radial direction, so that it is guided at the output hub 25 or at the transmission input shaft 2. The guiding is preferably performed pressure and liquid tight by providing the inner disk carrier with a radially configured flange portion 39 at the inner diameter, which flange portion forms an axially oriented flange surface, at which a seal device 42, disposed in the output hub 25, is guided. Thus, the support 30 is guided pressure and liquid tight at its inner circumference at the output hub 25. The connection 43 with the damper input 23 can be performed at any location in radial direction at the support 30, in particular at the inner disk support. Also here, the configuration of the chamber 19 is performed between the piston element 10, in particular the face oriented away from the pressure loadable chamber 11, while using the piston element 10 and the support 30. The connection 21 is provided in axial direction between the piston element 10 and the support 30 and extends also here through the output hub 25 in radial direction.

Figure 3:
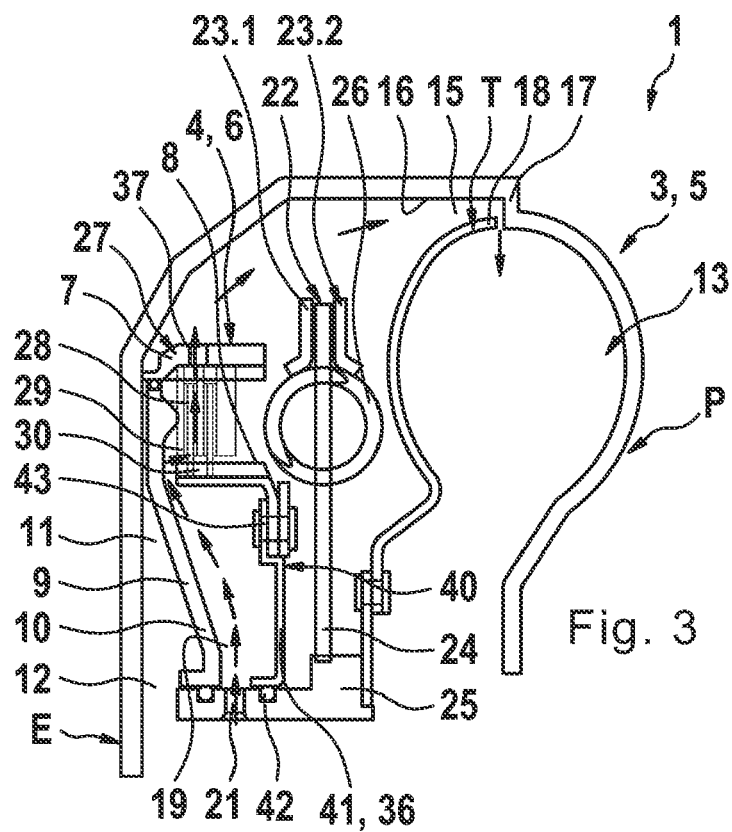

With respect to the embodiment illustrated in FIG. 2, FIG. 3 illustrates an improvement, in which no modifications at the support 30 and at the damper input occur, compared to conventional configurations with respect to the configuration of the chamber 19, and which furthermore provides a simple retrofit capability. For this purpose, a separate seal plate 36 is provided, which is connected torque proof to the support 30. The coupling is preferably performed in the portion of the non-rotatable connection 43 of the second clutch component 8 with the damper input 23. Also the seal plate 36 is characterized in the portion of its inner diameter by a seal surface with the drive hub 25. The element provided as seal plate 36 can thus be retrofitted in existing configurations in a simple manner without having to perform additional modifications, besides a seal device which may be provided. Also here, the flow guidance in radial direction is performed on the shortest path to the actuatable clutch device 4. The connection 21 is thus preferably disposed in the portion of the axial extension of the actuatable clutch device 4, this means in the portion of the axial extension of the disposition or the adjustment travel of the particular disk shaped elements of the particular clutch components 7 and 8, thus facilitating a direct exit in radial direction, and the supply to the particular disk shaped elements, wherein the face of the piston element 10, which is effective at the particular disk shaped elements, is configured so that it acts as a guide surface for the flow medium functioning as a coolant in this case. In the portion of the effective piston surface of the piston element 10, the deflection of the flow medium is performed into the disk shaped elements, wherein they can be provided with a respective pass-through opening as stated supra, or the clearance in radial direction in the connection between the particular disks and the particular support is being used. Due to the configuration of the pass-through openings 37 at the support 27 and their orientation in a radial direction, thus a flow within the actuatable clutch device 4 is implemented, which is characterized by the direct passage in the radial direction and thus facilitates optimum heat dissipation at the friction surface bearing elements, in particular at the friction surfaces.

The embodiments described in FIGS. 1 through 3 constitute particularly advantageous configurations. The solution according to the invention, however, is not limited to the embodiments. This applies, in particular, for the configuration of the force transmission device 1 by itself. Furthermore, the inventive solution does not depend on the disposition of the particular components. It is essential, that the cooling cycle is facilitated from the theoretically available intermediary space for routing the flow medium, when the external cooling cycle is generated, through the hydrodynamic component 3 by routing it from the operating cavity 13 to the cooling cycle through the intermediary cavity 15 back into the operating cavity 13. The flow path for the flow medium is thus routed in a concentrated manner through the actuatable clutch device 4.

Reference Numerals and Designations
1 force transmission device
2 transmission input shaft
3 hydrodynamic component
4 actuatable clutch device
5 hydrodynamic power path
6 mechanical power path
7 first clutch component
8 second clutch component
9 actuation device
10 piston element
11 cavity loadable with pressure means
12 connection
13 operating cavity
14 inner diameter
15 intermediary space
16 inner circumference
17 housing
18 outer circumference
19 cavity
20 connection
21 connection
22 vibration damper
23 damper input
23.1 drive disk
23.2 drive disk
24 damper output
25 output hub
26 means for torque transmission and damper coupling
27 support
28 friction surface bearing or friction surface forming element
29 friction surface bearing or friction surface forming element
30 support
31 outer circumference
32 inner circumference
33 seal device
34 seal device
36 seal plate
37 openings
38 seal device
39 flange portion
40 means defining a channel and/or chamber
41 wall
42 seal device
43 non-rotatable connection
E input
A output
R rotation axis

What we claim is:
1. A force transmission device (1) comprising:
an input (E) and an output (A);
a hydrodynamic component (3) disposed between the input (E) and the output (A), comprising at least a pump shell (P) and a turbine shell (T), forming an operating cavity (13) in combination, and comprising an actuatable clutch device (4) for at least partially bridging the hydrodynamic component (3), comprising a first clutch component (7) connected to the input (E) and a second clutch component (8) at least indirectly connected to the output (A), which can be brought into operative engagement with one another through an actuation device (9);
a vibration damper (22), disposed at least subsequent to the actuatable clutch device in a force flow;
a housing (17), coupled with the input (E) or with an element connected non-rotatably with said input, and coupled with the pump shell (P), which encloses the actuatable clutch device (4) and the vibration damper (22) and forms an intermediary cavity (15); and, means (40) for separating a channel and/or a first chamber (19) from the intermediary cavity (15) for generating an oriented flow through the actuatable clutch device (4), wherein:
- the chamber (19) is formed by the actuation device (9) and by a wall (41) disposed pressure tight between the second clutch component (8) and the output (A), or by an element connected non-rotatably with said output;
- the wall (41) is formed by a seal plate (36), which can be connected non-rotatably with the second clutch component (8) or with the damper input (23); and,
- coupling of the seal element (36) with the second clutch component (8) is performed on a common diameter with a connection of the second clutch component (8) with the damper input (23), while using the same connection elements.

2. The force transmission device (1) according to claim 1, wherein the actuation device (9) comprises at least a piston element (10), which can be actuated by a second chamber, which can be loaded with pressure means, wherein the first chamber (19) and/or the channel is formed by the piston element (10) and by the wall (41).

3. The force transmission device (1) according to claim 1, wherein the wall (41) is at least partially formed by the second clutch component (8) of the actuatable clutch device (4).

4. The force transmission device (1) according to claim 3, wherein the support (30) of the second clutch component (8) is configured as an inner disk carrier.

5. The force transmission device (1) according to claim 1, wherein the actuatable clutch device (4) is configured in disk construction, wherein each clutch component (7, 8) comprises a support (27, 30) and thereon friction surface bearing or friction surface forming elements (28, 29), movably guided thereon in axial direction and connected non-rotatably therewith, and the wall (41) is completely formed by the support (30) of the second clutch component (8).

6. The force transmission device (1) according to claim 1, wherein the vibration damper (22) comprises at least one damper input (23) and one damper output (24), coupled to one another through means (26) for torque transmission and damper coupling, wherein the wall (41) is formed by the damper input (23), comprising at least one drive disk (23.1) coupled non-rotatably with the second clutch component (8), and a seal device (42), disposed between the drive disk (23.1) and the output (A), or the element connected non-rotatably with said output.

7. The force transmission device (1) according to claim 1, wherein the first clutch component (7) comprises radially oriented pass-through openings (37) in the support (27).

8. The force transmission device (1) according to claim 1, wherein the input (E) is formed by the housing (17) or by an element coupled non-rotatably with said input, and the output (A) is formed by a transmission input shaft (2) or by an element coupled non-rotatably with said output.

* * * * *